(12) United States Patent
Brückner et al.

(10) Patent No.: US 7,509,794 B2
(45) Date of Patent: Mar. 31, 2009

(54) WASTE HEAT STEAM GENERATOR

(75) Inventors: Jan Brückner, Uttenreuth (DE); Erich Schmid, Orlando, FL (US); Eva Windecker, Bad Kissingen (DE)

(73) Assignee: Siemens Aktiengesellschaft, Munich (DE)

( * ) Notice: Subject to any disclaimer, the term of this patent is extended or adjusted under 35 U.S.C. 154(b) by 463 days.

(21) Appl. No.: 10/519,138

(22) PCT Filed: Jun. 12, 2003

(86) PCT No.: PCT/DE03/01966

§ 371 (c)(1),
(2), (4) Date: Aug. 4, 2005

(87) PCT Pub. No.: WO04/001288

PCT Pub. Date: Dec. 31, 2003

(65) Prior Publication Data
US 2006/0162315 A1    Jul. 27, 2006

(30) Foreign Application Priority Data
Jun. 25, 2002 (DE) .................. 102 28 335

(51) Int. Cl.
F02C 6/00 (2006.01)
F02C 7/08 (2006.01)
F22B 1/18 (2006.01)

(52) U.S. Cl. .......... 60/39.182; 60/39.52; 122/7 B
(58) Field of Classification Search ............ 60/39.182, 60/39.52; 122/7 R, 7 B
See application file for complete search history.

(56) References Cited

U.S. PATENT DOCUMENTS 3,204,407 A    9/1965  Meissenberg et al.
4,831,817 A *  5/1989  Linhardt .............. 60/39.12
5,365,730 A * 11/1994  Bruckner et al. ....... 60/39.182

FOREIGN PATENT DOCUMENTS

| DE | 38 24 813 C2 | 1/1990 |
| DE | 198 29 088 A1 | 1/2000 |
| EP | 0 889 204 A2 | 1/1999 |
| FR | 2 692 966 | 12/1993 |
| GB | 1 553 867 | 10/1979 |

* cited by examiner

Primary Examiner—Michael Cuff
Assistant Examiner—Gerald L Sung

(57) ABSTRACT

The invention relates to a waste heat steam generator of a gas fired and steam powered generator. Said generator comprises a waste heat boiler to which exhaust gas of a gas turbine can be supplied. Said steam generator also comprises at least one evaporator which is located in the waste heat boiler and is used to produce process steam for a steam turbine. According to the invention, flue gas from a heating device can be supplied to the waste heat boiler and at least part of said flue gas can be extracted at at least one point of the waste heat boiler and redirected back to the inlet of said waste heat boiler.

12 Claims, 2 Drawing Sheets

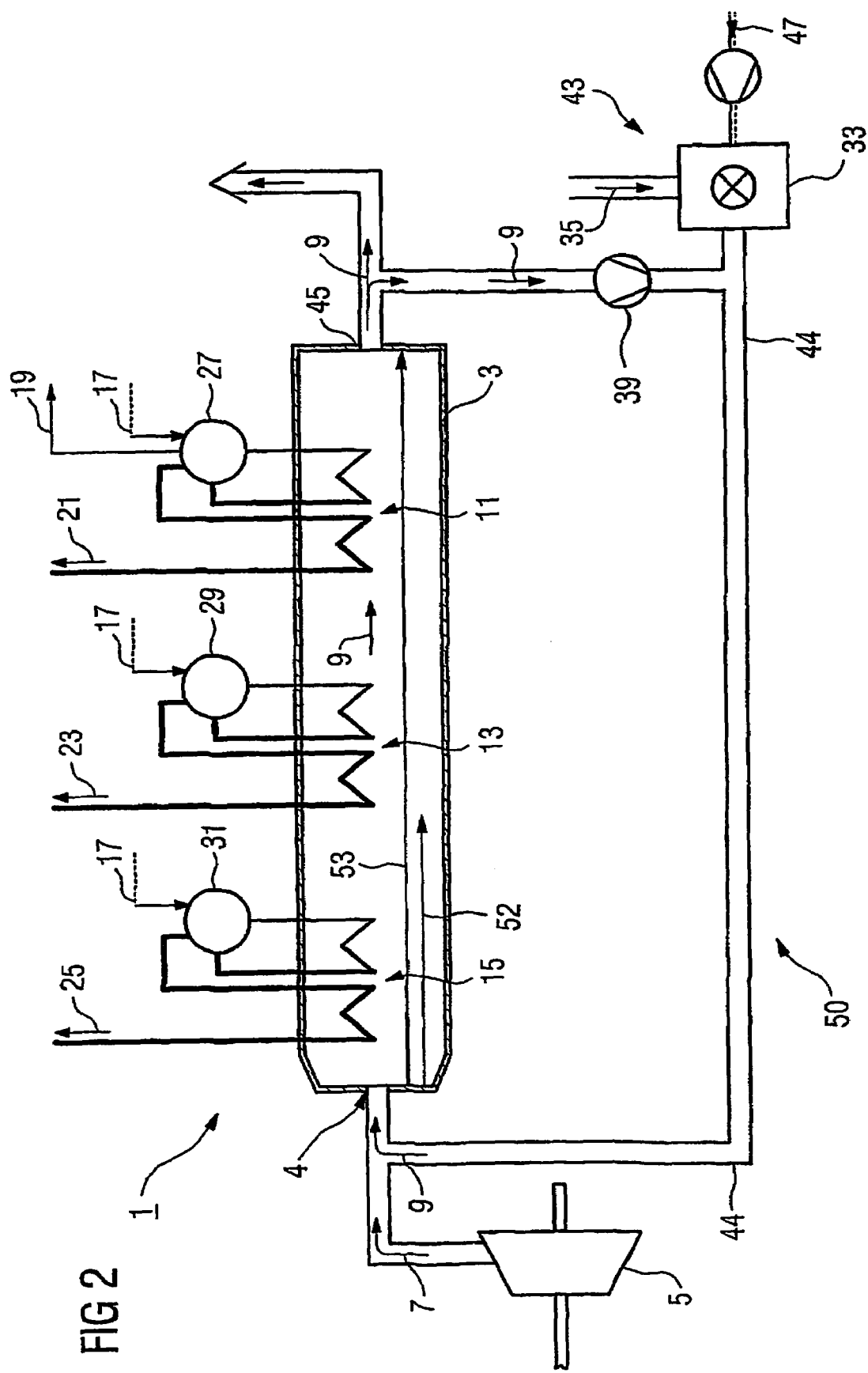

WASTE HEAT STEAM GENERATOR

CROSS REFERENCE TO RELATED APPLICATION

This application is the US National Stage of International Application No. PCT/DE2003/001966, filed Jun. 12, 2003 and claims the benefit thereof. The International Application claims the benefits of German Patent application No. 10228335.4 DE filed Jun. 25, 2002, both of the applications are incorporated by reference herein in their entirety.

FIELD OF THE INVENTION

The invention relates to a waste heat steam generator which has a waste heat boiler which is operated by means of waste heat from a gas turbine.

BACKGROUND OF THE INVENTION

Many modern power station installations, which are equipped with gas turbines in order to generate electrical power, also have one or more waste heat boilers in order to use the hot exhaust gas from the gas turbines (which still has a high energy potential after being ejected from the gas turbine) for further conversion to usable power. In this case, for example, the steam generated by the waste heat boiler is used for operation of at least one steam turbine, so the efficiency of a gas and steam power station such as this is higher than that of a pure gas turbine power station.

In addition to the steam turbine, modern gas and steam power stations require auxiliary steam for widely differing further consumers (for example bypass flow degasifiers, building heating, etc.).

This auxiliary steam is required in particular when the installation is not in use and when starting up and/shutting down the turbine sets, as well as during normal operation of the power station installation, for example at the rated load.

When the installation is not in use, the gas turbine does not emit any hot exhaust gas, so that no operating steam, and no auxiliary steam either, can be provided by means of the waste heat boiler in this operating situation for the steam turbine or for further steam consumers, as mentioned by way of example above.

In order to supply steam consumers such as these with auxiliary steam, an independent, heated auxiliary steam generator, which is completely isolated from the waste heat steam generator, is generally used in known power stations.

Auxiliary steam generators such as these generate saturated steam, that is to say superheated steam, when the installation is not in use and during starting up/shutting down, and this is supplied to the steam consumers mentioned above.

During normal operation of the installation, the auxiliary steam that is required is generated, for example, in a low-pressure section of the waste heat steam generator while, during normal operation, the auxiliary steam generator, which is designed such that it is separate from the waste heat steam generator, is not necessarily required, since the auxiliary steam can be generated in the waste heat steam generator itself, from the hot exhaust gas that is introduced into it.

Dispensing with the auxiliary steam generator in a known power station installation is often possible only in exceptional situations (for example in the case of pure basic load power stations which operate virtually around the clock and in which hot exhaust gas is therefore available all the time for auxiliary steam generation), and leads to considerable restrictions on the flexibility of the installation since, for example, a complete installation shut down or operation at a very low load leads to loss of the auxiliary steam generation.

Further requirements for power station installations include heating up, keeping hot and maintaining the pressure in the waste heat boiler and the fresh steam lines, as well as heating up and keeping hot the steam turbine at a temperature and a pressure level which are as high as possible; the stated requirements should also be satisfied when the installation is not in use and while the turbines are being started up or shut down.

By way of example, the starting-up time for a known power station installation is dependent on the pressure and the temperature of the auxiliary steam.

SUMMARY OF THE INVENTION

The invention is thus based on the object of specifying a waste heat steam generator which allows flexible operation of the power station installation, and which can be designed to be particularly cost-effective.

According to the invention, the object is achieved by a waste heat steam generator for a gas and steam power station, which has a waste heat boiler to which exhaust gas from a gas turbine can be supplied, and which also has at least one evaporator, which is arranged in the waste heat boiler, in order to generate operating steam for a steam turbine, wherein the waste heat boiler can be supplied with flue gas from a heating device, and at least a portion of the flue gas can be extracted at at least one point from the waste heat boiler, and can be fed back to an inlet opening into the waste heat boiler.

In consequence, in a waste heat steam generator according to the invention, at least a portion of the flue gas which leaves the waste heat boiler and/or which is extracted from the waste heat boiler at at least one point upstream of its outlet opening is carried in a flue gas circuit.

The heating device has, for example, a burner to which fuel and combustion air, as well as the portion of the flue gas as the medium to be heated, are supplied. The flue gas which has been heated by means of the heating device is then (once again) introduced into the waste heat boiler, where, by means of exchange of heat, it emits energy to the evaporator, so that the latter can generate auxiliary steam. The auxiliary steam can then, for example, be extracted from a steam drum that is part of the evaporator, with consumers being supplied with auxiliary steam, as well as fresh steam lines and/or the steam turbine.

The flue gas, which has been cooled down while it flows through the waste heat boiler, is passed after extraction of at least a portion back to the inlet opening of the waste heat boiler, and is heated by means of the heating device.

The heating device is in this case preferably designed for steam loads which correspond to a required auxiliary steam load and/or an amount of heat required for heating fresh steam lines and/or the steam turbine.

A waste heat steam generator according to the invention ensures the auxiliary steam supply in particular in operating situations in which no hot exhaust gas, or only a small amount of hot exhaust gas, is available (for example when not in use, during starting up/shutting down etc.). Furthermore, this avoids the heating system being designed to be unnecessarily powerful, since there is no need to use it to generate the operating steam for the steam turbine.

Furthermore, the auxiliary steam which is required during normal operation of the power station installation can alternatively or in addition to the heating system be produced by means of the exhaust gas.

Excess flue gas may, for example, be passed into a chimney after leaving the waste heat boiler.

The amount of auxiliary steam generated by means of a waste heat steam generator according to the invention is advantageously determined by controlling the flow rate of flue gas which is introduced into the waste heat boiler, for example by means of a control valve, which is arranged upstream of and/or downstream from a burner for the heating device, in the flow direction of the flue gas.

The temperature of the flue gas of a waste heat steam generator according to the invention is set in particular by the flow rate of fuel which is supplied to the heating device. Increasing the fuel supply in this case results in an increase in the combustion temperature, and thus in an increase in the heating-up temperature for the flue gas.

The amount of combustion air which is required by the heating device for a waste heat steam generator according to the invention is advantageously controlled, for example by means of a further control valve which is connected in an air supply line to the heating device.

Embodiments of the invention relate to the configuration of a circulation circuit for the flue gas, and to the arrangement of the heating device.

In a further embodiment, the waste heat steam generator has at least two evaporators.

Waste heat boilers equipped in this way and having evaporators at different temperature levels are known from a large number of power station installations.

The required auxiliary steam can then be extracted from that evaporator that is arranged at the temperature level which is suitable for the purpose of auxiliary steam generation, for example that evaporator which generates the operating steam for a low-pressure stage of the steam turbine during operation of the power station installation.

The at least one portion of the flue gas can in this case preferably be extracted from the waste heat boiler upstream of at least one of the evaporators in the flow direction of the flue gas.

The energy content of the flue gas at an extraction point such as this has not yet been greatly reduced.

In a further advantageous refinement of the invention, the at least one portion of the flue gas can be extracted from the waste heat boiler at or in the flow direction of the flue gas downstream from its outlet opening.

In this case, the flue gas has passed completely through the waste heat boiler before the at least one portion of the heating device is fed back.

This ensures that virtually the entire amount of flue gas which is introduced into the waste heat boiler can interchange heat with the evaporator from which the auxiliary steam is extracted.

In order to control the auxiliary steam generation, the heating device advantageously has at least one control device for adjustment of the temperature and/or the flow rate of the flue gas.

In this embodiment, the respectively required amount and energy content of the auxiliary steam can be generated specifically in each operating situation of the power station.

Additional embodiments of the invention relate to the role of the auxiliary steam as working or beating steam, in which case the auxiliary steam can preferably be extracted in every operating situation, that is to say in particular even while the installation is not in use, and while the installation is being started up and shut down.

BRIEF DESCRIPTION OF THE DRAWINGS

Two exemplary embodiments of the invention will be described in more detail in the following text.

In the figures:

FIG. 2 shows an alternative embodiment of the invention, with a heating device connected in a circulation circuit.

DETAILED DESCRIPTION OF THE INVENTION

Figure 1:
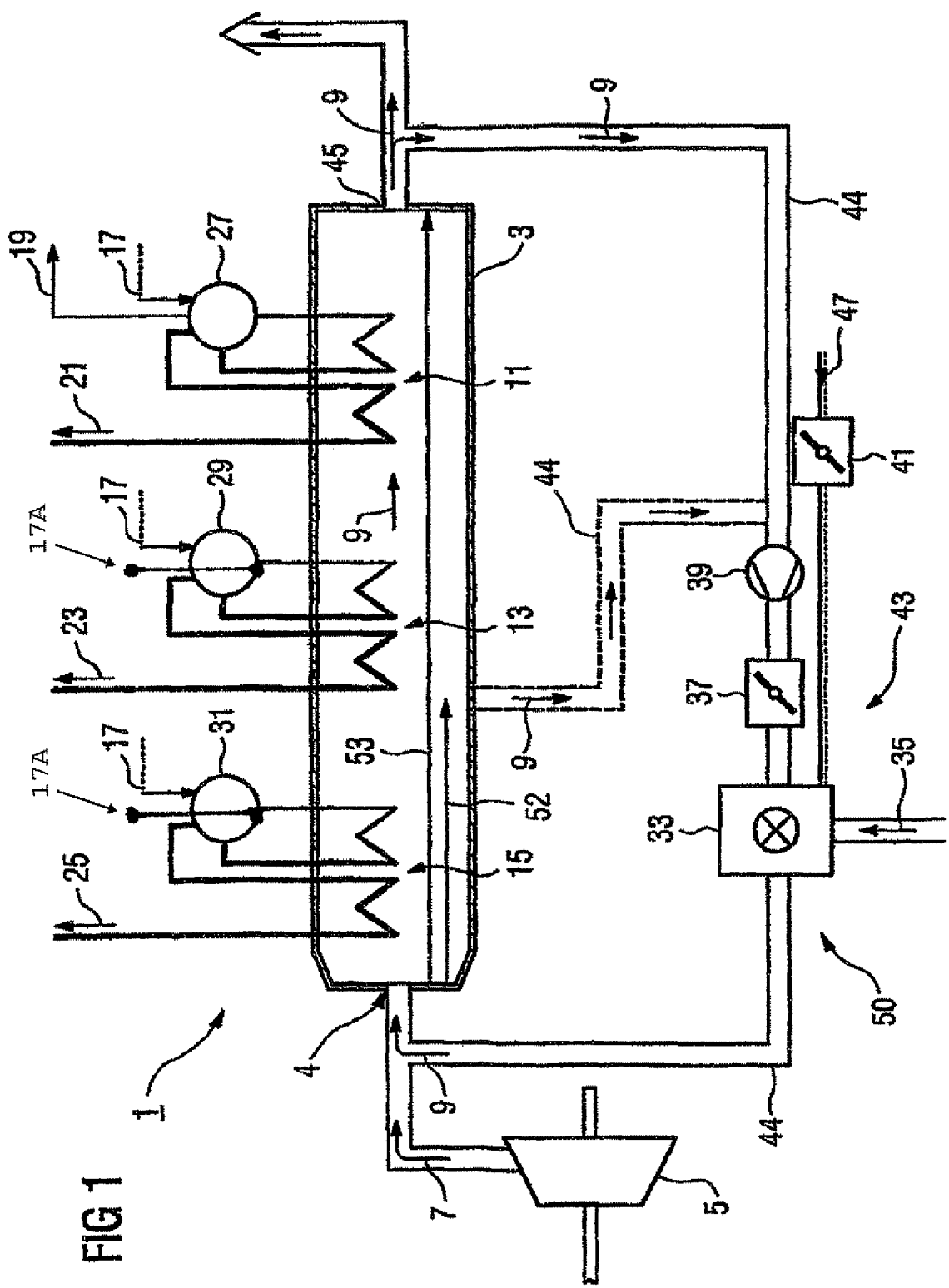
FIG. 1 shows a schematic illustration of the waste heat steam generator according to the invention, having a heating device connected in a circulation circuit.

The arrangement of a waste heat steam generator 1 according to the invention is illustrated schematically in FIG. 1.

In order to assist clarity, the waste heat steam generator 1 is in this case illustrated in a horizontal position. In a physical embodiment, the waste heat steam generator 1 may, of course, be arranged vertically, that is to say with an essentially vertical extent.

The waste heat steam generator 1 has a waste heat boiler 3, into which exhaust gas 7 from a gas turbine 5 is introduced through an inlet opening 4 in the waste heat boiler 3.

In the present exemplary embodiment, heat exchanger surfaces of three evaporators are arranged in the waste heat boiler 3 specifically of a high-pressure evaporator 15, of a medium-pressure evaporator 13 and of a low-pressure evaporator 11.

Each of the evaporators 15, 13, 11 which have been mentioned has a high-pressure drum 31, a medium-pressure drum 29 and a low-pressure drum 27.

The drums 31, 29, 27 are in this case each supplied with feed water 17 via a line which is not shown in any more detail.

A heating device 43 which has a burner 33 (which is operated by means of fuel 35), a fan 39 and control valves 37, 41 is arranged effectively in parallel with the waste heat boiler 3 in a feedback line 44. This results in a circulation circuit 50 being formed by a heating path 52, 53 through the waste heat boiler 3 and the feedback line 44.

The heating by means of the burner 33 results in flue gas 9 which is introduced into the waste heat boiler 3. The flue gas 9 passes through the waste heat boiler 3 along the heating path 52, 53, in the process coming into contact with the heating surfaces of the evaporators 15, 13, 11.

Feed water 17 is introduced into the areas inside the heating surfaces of the evaporators 15, 13, 11 by means of the respective steam drum 31, 29 or 27, so that steam can be generated by means of heat exchange. High-pressure steam 25 can thus be extracted from the high-pressure evaporator 15, medium-pressure steam 23 from the medium-pressure evaporator 13, and low-pressure steam 21 from the low-pressure evaporator 11. These respective steam elements 25, 23 and 21, which are produced by means of the evaporators 15, 13, 11, can then be supplied in a manner which is not illustrated in any more detail to the appropriate pressure stages of a steam turbine.

Furthermore, auxiliary steam 19, for example for the auxiliary steam consumers in the power station or for heating installation components such as fresh steam lines, can be extracted from the low-pressure evaporator 11, in particular from its low-pressure drum 27.

Auxiliary steam 19 can be extracted even in operating situations in which no exhaust gas 7, or only a small amount of exhaust gas 7, is available from the gas turbine 5, for example when not in use or while the gas turbine 5 is being started up or shut down.

The energy which is required for generation of the auxiliary steam 19 is provided, in particular in operating situations such as this, by the flue gas 9 which is generated by means of the heating device 43 and is passed through the waste heat boiler 3.

Whilst the flue gas 9 leaves the waste heat boiler 3 through its outlet opening 45, at least a portion of it is fed back by means of the feedback line 44 to the inlet opening 4 of the waste heat boiler 3; a flue gas circuit is thus formed in a waste heat steam generator according to the invention, which results in particular in the energy. contained in the flue gas 9 being utilized particularly well.

Alternatively or in conjunction, the at least one portion of the flue gas 9 can also be extracted at a point other than the outlet opening 45 from the waste heat boiler 3, and can be fed back to the heating device 43. A suitable point in this case is, for example, a point in the flow direction of the flue gas 9 upstream of the medium-pressure evaporator 13, while the flue gas 9 has not yet been very greatly cooled down; this option for alternative or additional feedback of the flue gas 9 is illustrated by dashed lines in the figure.

The temperature of auxiliary steam 19 that is generated can be set by variation of the flow rate of the fuel 35 which is supplied to the burner 33; the flow rate of the combustion air 47 which is required for operation of the burner 33 is advantageously controlled by means of a control valve 41 which is connected in an air supply line to the burner.

Furthermore, the flow rate of the auxiliary steam 19 to be generated can be adjusted by means of a further control valve 37, which is connected upstream of the burner in the flow direction of the flue gas 9, in order to adjust the flow rate of the flue gas 9 that is supplied to the burner; the flue gas 9 can be supplied to the burner 33 by means of a fan 39.

FIG. 1 shows, schematically, the method procedure for auxiliary steam generation in a waste heat steam generator 1 according to the invention, based on the example of a waste heat steam generator 1 for a three-pressure gas and steam process with intermediate superheating. The invention can also be used for other processes (for example for a two-pressure process with intermediate superheating, etc.).

In one method of operation of the waste steam generator 1 according to the invention, slides 17A which are connected in the supply lines to the high-pressure and medium pressure evaporators can be closed so that no steam in generated in these pressure stages. The cooled-down flue gas is tapped off at outlet opening 45, with at least a portion of the flue gas 9 being fed back to inlet opening 4. Excess flue gas is emitted either via an existing chimney or via a separate chimney with a suction path.

The burner 33 heats the flue gas 9 by combustion, for example, of natural gas to the temperature required at the inlet to the waste heat steam generator 1; the required combustion air 47 is supplied, for example, via a combustion air fan.

The flow rate of auxiliary steam is controlled by variation of the flue gas flow rate flowing through the waste heat steam generator, for example by means of the control valve 37.

The flue gas temperature is controlled by variation of the fuel flow rate.

The further control valve 41 is used, for example, to control the required combustion air flow rate.

If a separate chimney with a suction path is used, the pressure on the flue gas side of the system can be controlled, for example, by means of an additional control valve.

In an alternative method of operation of the waste heat steam generator according to the invention, the slides 17A which have already been mentioned are opened, so that steam is generated in all of he pressure stages. The steam from the high-pressure evaporator 15 and/or from the medium-pressure evaporator 13 of the waste heat steam generator 1 may, for example, be used to heat up/keep hot a fresh steam line for the steam turbine in the power station.

FIG. 2 shows an alternative embodiment of a waste heat steam generator 1 according to the invention in which, in contrast to FIG. 1, the heating device 43 is not connected in but to the feedback line 44.

Investigations have shown that an arrangement of a heating device 43 such as this results in advantages since, for example, the recirculation circuit can be maintained even in the event of temporary malfunctions of the heating device 43—although possibly with a reduced energy content in the flue gas 9 in some circumstances. Furthermore, with this arrangement, the volume flow of the flue gas 9 in the feedback line 44 is not interfered with by any intermediate component, thus assisting smooth operation; in the embodiment shown in FIG. 1, the recirculation circuit can likewise be maintained in the event of a malfunction of the heating device 43, provided that the feedback line 44 is not closed inadvertently as a result of the malfunction.

The fan 39 is connected in the feedback line 44 and carries out the function of a recirculation fan.

Control devices for adjusting the flow rate of recirculated flue gas 9 can also be connected in the feedback line 44.

A waste heat steam generator according to the invention results, inter alia, in the following advantages:
  there is no need for a separate auxiliary steam generator,
  the waste heat steam generator can be kept hot even when the system is not in use, so that there is no need for any otherwise required frost protection measures,
  the waste heat steam generator can be kept at a relatively high pressure while not in use, so that the stress loads on components with thick walls as a result of temperature changes (during heating up and cooling down) can be considerably reduced when starts occur frequently, and
  the fresh steam line for the steam turbine and the steam turbine itself can be kept hot and/or can be heated up, thus considerably shortening the starting-up times for the overall installation, which, inter alia, leads to a considerable reduction in the exhaust gas emissions.

The invention claimed is:

1. A waste heat steam generator for a gas and steam power station, comprising:
  a waste heat boiler that is supplied exhaust gas from a gas turbine at a waste heat boiler inlet opening;
  multiple evaporators, including a high pressure evaporator, a medium-pressure evaporator, and a low-pressure evaporator arranged in the waste heat boiler to generate operating steam for a steam turbine, the high pressure evaporator connected to a high pressure steam drum, the medium-pressure evaporator connected to a medium pressure steam drum, and the low-pressure evaporator connected to a low pressure steam drum so that steam can be generated;
  a heating device that supplies flue gas to the waste heat boiler;
  an air control valve for controlling air entering the heating device;
  a feedback line to feed back the flue gas to a circulation circuit;
  a flue flow rate control valve for controlling the rate flue gas is applied to the circulation circuit;
  wherein the circulation circuit has the heating device connected to it and is formed by a heating path through the waste heat boiler and the feedback line and a portion of the flue gas can be extracted at a point from the waste heat boiler and can be fed back to the inlet opening into the waste heat boiler; and a slide connected to a respective feed water supply line and the respective steam drum in at least two of the evaporators so that when the selected supply line is opened or closed steam generation in the corresponding pressure stage is controlled;

wherein the heating device, heating device air control valve, flue rate flow control valve, and the slides allow auxiliary steam to be extracted from a low pressure evaporator by selectively controlling the high pressure evaporator and medium pressure evaporator in operating situations in which no exhaust gas is available from the gas turbine, including when the gas turbine is not in use or while the gas turbine is being started up or shut down.

2. The waste heat steam generator as claimed in claim 1, wherein a portion of the flue gas can be extracted from the waste heat boiler upstream of the evaporators and in the direction of the flue gas.

3. The waste heat steam generator as claimed in claim 1, wherein a portion of the flue gas can be extracted from the waste heat boiler in the flow direction of the flue gas and downstream from its outlet opening.

4. The waste heat steam generator as claimed in claim 1, wherein the heating device has a control device for adjustment of the temperature or the flow rate of the flue gas.

5. The waste heat steam generator as claimed in claim 1, wherein the heating device has a control device for adjustment of the temperature and the flow rate of the flue gas.

6. The waste heat steam generator as claimed in claim 1, wherein a portion of auxiliary steam can be extracted from an evaporator for operation of a steam consumer from the gas and steam power station.

7. The waste heat steam generator as claimed in claim 1, wherein a portion of auxiliary steam can be extracted from an evaporator in order to heat up and keep hot a steam line.

8. The waste heat steam generator as claimed in claim 1, wherein a portion of auxiliary steam can be extracted from an evaporator in order to heat up or keep hot a steam line.

9. The waste heat steam generator as claimed in claim 1, wherein a portion of auxiliary steam can be extracted from an evaporator in order to maintain the pressure in the waste heat boiler and can be extracted from fresh steam lines from the steam turbine in the gas and steam power station.

10. The waste heat steam generator as claimed in claim 1, wherein a portion of auxiliary steam can be extracted from an evaporator in order to maintain the pressure in the waste heat boiler or can be extracted from fresh steam lines from the steam turbine in the gas and steam power station.

11. The waste heat steam generator as claimed in claim 7, wherein the auxiliary steam can be extracted largely independently of the operating state of the gas turbine or of the steam turbine.

12. The waste heat steam generator as claimed in claim 7, wherein the auxiliary steam can be extracted largely independently of the operating state of the gas turbine and of the steam turbine.

* * * * *